June 9, 1925.  
L. J. BADARACCO  
1,540,743  
METHOD OF CLEANING AUTOMOBILES  
Filed April 14, 1923
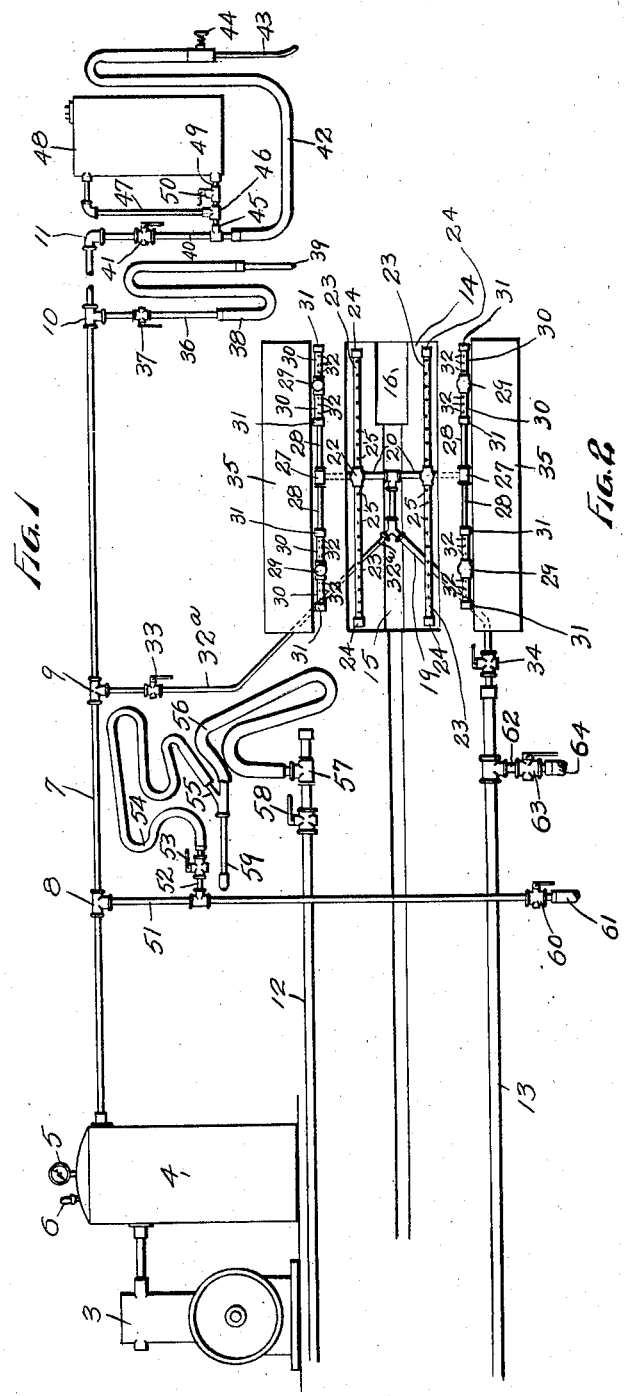
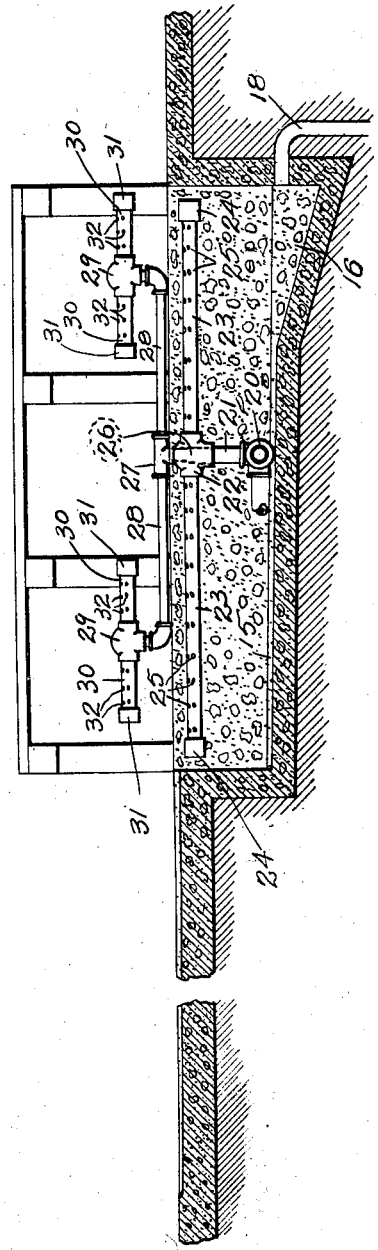
INVENTOR  
LOUIS J. BADARACCO  
BY Edward E. Longan  
ATT'Y Patented June 9, 1925.

1,540,743

UNITED STATES PATENT OFFICE.

LOUIS J. BADARACCO, OF ST. LOUIS, MISSOURI, ASSIGNOR TO THE AUTO LAUNDRY SYSTEM COMPANY, OF ST. LOUIS, MISSOURI, A CORPORATION OF MISSOURI.

METHOD OF CLEANING AUTOMOBILES.

Application filed April 14, 1923. Serial No. 632,041.

*To all whom it may concern:*

Be it known that I, LOUIS J. BADARACCO, a citizen of the United States, and resident of the city of St. Louis, State of Missouri, have invented certain new and useful Improvements in Methods of Cleaning Automobiles, of which the following is a specification, containing a full, clear, and exact description, reference being had to the accompanying drawings, forming a part thereof.

My invention relates to improvement in the method of cleaning automobiles and has for its primary object the method of cleaning automobiles as a continuous operation whereby the automobile is advanced step by step past various stations and thoroughly cleansed of all grease and dirt.

A further object is the method of cleaning automobiles whereby a completely cleaned machine can be turned out in about twenty minutes as against from one and one-half to two hours where the ordinary method of cleaning is employed.

In the drawings—

Fig. 1 is a diagrammatic view of one form of apparatus used in carrying out my invention;

Fig. 2 is an enlarged longitudinal vertical section of a portion of the apparatus showing the manner of spraying the chassis and wheels and the top cleaning station.

In carrying out my method, I employ an air compressor 3 which is attached to an air storage tank 4. The compressor 3 is driven by any suitable means, such as belt power, or may be directly connected to an engine, motor or other power device. The tank 4 is preferably provided with a pressure gage 5 and a safety valve 6. Connected to the tank 4 is an air line 7. The air line 7 is provided at suitable intervals with connections 8, 9, 10 and 11. The purpose of these connections will be explained in detail later. 12 and 13 represent water mains which are connected to any suitable source of supply, such as the city water main.

My apparatus is preferably housed in a building which has a concrete or cement floor. One portion of this floor is depressed forming a pit 14. The pit 14 has a center gutter 15 which communicates with a depressed portion 16. The depressed portion 16 forms a sediment pocket and also communicates with a waste pipe 18. Secured to the water main 13 is a pipe 19 which is in turn connected to a pipe 20. The pipe 20 is provided with risers 21, to the upper end of which is secured a pipe connection 22. To the pipe connection 22 are secured pipes 23 which have their free ends closed by means of a cap 24. The pipes 23 are provided with openings or perforations 25. The pipes 23 are arranged along each side of the pit 14 and are for the purpose of spraying the underside of the automobile. The pipes 20 are also provided with risers 26; the upper end of each is attached to a T 27, in which pipes 28 are secured. The pipes 28 are in turn secured to a fitting 29 in which pipes 30 are secured. The pipes 30 have their free ends closed by means of caps 31 and are provided with openings or perforations 32. The openings 32 are so formed as to spray water underneath the fender and on to the wheels, and in connection with the pipes 23 form the soaking device, as will be explained later. Secured to the fitting 9 is an air pipe 32ª having a controlling valve 33. The pipe 32ª is connected to the soaking device so that air pressure may be utilized to obtain a stronger stream if desired. The passage of water to the soaking device is controlled by means of a valve 34. Located on either side of the pit 14 are platforms 35 which raise the operator sufficiently high so as to enable the top of the automobile to be washed. Secured in the fitting 10 is a pipe 36 which has a controlling valve 37. To the pipe 36 is attached a hose 38 which is equipped with a nozzle 39. The fitting 11 has a pipe connection 40 having a controlling valve 41. This pipe has attached thereto a hose 42 which is equipped with a nozzle 43. The nozzle 43 is equipped with a spring actuated valve 44, which is preferably operated by thumb pressure. The pipe connection 40 has connected thereto a branch pipe 45 which carries a connection 46. To this connection is secured a pipe 47 which leads into the top of a kerosene tank 48. The connection 46 also carries a pipe 49 which is secured to the bottom of the kerosene tank. The connection 46 is controlled by means of a valve 50. The fitting 8 carries a pipe 51 which is provided with a branch 52 and a valve 53. Secured to the valve 53 is a hose 54 which is connected to a Y 55. Connected to the Y 55 is a hose 56 which is secured to the pipe 12 by means of a fitting 57. The passage of water into the hose 56 is controlled by the valve 58. The Y also carries a nozzle 59 through which a mixture of air and water passes. The pipe 51 is also provided with a valve 60 which controls the passage of air into the hose 61. The hose 61 is also secured to a Y as has been previously described. The pipe 13 has a connection 62 which is controlled by means of a valve 63 to which a hose 64 is attached. This hose is also attached to the Y. The Y 55 and nozzle 59 will be hereafter termed the gun.

The operation of my method is as follows:—The compressor 3 is started storing air pressure in the tank 4. This pressure passes through the pipe line 7 and up to the various valves. The kerosene tank 48 is filled with kerosene and the device is then ready for operation. When a car is received for cleaning, the valve 41 is first opened. The opening of the valve 41 allows air to enter the hose 42 until it is stopped by the valve 44. It also permits air pressure to enter the kerosene tank 48 above the kerosene. The valve 50 is then opened and kerosene allowed to enter the hose 42. The valve 44 is then depressed allowing a mixture of kerosene and air to emerge from the nozzle 43. This mixture issues from the nozzle in the form of a mist and is used on the chassis, transmission, propeller-shaft housing, splash pan and other oily parts of the automobile. In the event that the automobile has traveled over freshly oiled roads, it is also used on the wheels and the underside of the fenders. The kerosene spray can also be used to advantage in cleaning the engine. After the greasy parts of the automobile have been thoroughly sprayed, the automobile is moved forward to the next station, in the meantime the valve 41 having been closed off. The valve 37 is then opened and compressed air from the tank allowed to escape through the nozzle 39, which is used for dusting the inside of the automobile. The air being under a high pressure, readily blows out all road dust from the tufting in the seats and from corners, as well as from the inside of the top and other places where it is not desired to use moisture. After the automobile has been thoroughly dusted, during all of which time the kerosene has had a chance to soak into and loosen the accumulation of oil and dust, the automobile is pushed over the pit 14. The valve 34 is then opened. This allows a needle spray to strike the underside of the automobile and also the sides beneath the fenders. In the event that the water pressure in itself is not great enough, I may open the valve 33 and use a mixture of air and water and thus get a stronger stream. This soaking further loosens any of the greasy dirt, the loosening of which has been commenced by the kerosene, and also softens up any ordinary road dirt which the wheels have splashed on to the automobile. While this soaking device is in operation, operators mount the platforms 35 and wash the top of the automobile. This may be either done with buckets of water and a sponge or with a hose and sponge. After the top has been thoroughly washed, the soaking apparatus is closed off and the automobile pushed forward to the next station. At this station the valves 58 and 63 controlling the water are opened and the valves 53 and 60 controlling the air. This causes a mixture of water and air to issue from the guns driven at a high rate of speed. The mixture of water and air is used for cleaning the underside and running gear of the automobile, as well as the fenders and running board, the body however, not being touched with this apparatus unless extremely dirty. After the automobile has been cleaned of all the heavy accumulation of dirt, the guns are shut off and the automobile moved forward. The body is then washed by means of water and sponges, the water being furnished either in buckets or by means of hose, but not under pressure. After the body has been thoroughly washed, another forward movement brings the automobile to the drying station, where the body is dried with a chamois and then polished, if desired, the polishing operation not being essential to the cleaning, but being optional with the customers.

By the use of my device a continuous stream of automobiles can be washed simultaneously, a number of operatives being employed at each station to take care of certain parts of the work and in this way I am able to turn out a completely washed and dry job at the rate of about one automobile every twenty minutes, although the actual passage of an automobile from the first station to the last takes considerably longer.

While I have shown only one gun on each side of the automobile, it is obvious I may employ more, this is especially desirable on rush days when a great number of automobiles must be cleaned, so that at least four operatives can be working on one automobile with the guns simultaneously. The same is true of the top washing, on rush days. I have found it preferable to employ an operative on each platform. By the use of my method the operatives are kept out of each other's way, and the ones doing the washing, who naturally become thoroughly wet, have nothing to do with the drying, as this is handled by an entirely different crew, consequently considerable time is saved and no water squirted around where the drying operation takes place.

All of the dirt washing off of the automobile passes down the gutter 15 and lodges in the depressed portion 16 which acts as a sediment pit, from which the sediment is periodically removed by means of a shovel. This prevents sediment from getting into the sewer or drain and clogging the same, but at the same time allows the water to drain off freely.

I preferably use a proportion of about fifteen per cent (15%) water and eighty-five per cent (85%) air in the guns as I have found this to be most satisfactory in removing the dirt. This however, can be varied by adjusting the water and air valves.

A great advantage of my system over the ordinary hose and sponge method is that the dirt, especially the heavy gritty dirt is floated and blown off by the guns and thus the finish of the automobile is not scratched at all. It is practically impossible to wash an automobile with a hose and sponge without scratching the finish of the automobile; this has been found a great cause of complaint where the ordinary washing methods were employed. Of course, if the body of the automobile is coated with heavy mud, I also use the air and water thereon, especially as a preliminary removing step but finish the body with clean soft water and a sponge.

Having fully described my invention, what I claim is:—

1. The method of cleaning automobiles and the like as a continuous operation and during which at least some portion of a car is constantly treated, which consists of steps taken in the following order first subjecting the greasy portions of the car to the action of a grease softening detergent mixed with air under pressure; second, permitting the grease thus treated to be impregnated with the detergent and simultaneously dusting the interior of the car with air under pressure; third, subjecting the undersides of the fenders and car and the wheels to a continuous spray of water under pressure for softening the road accumulations thereon and simultaneously washing the top of the car; fourth, subjecting the parts of the car thus treated by the detergent and the water spray to a high velocity spray of water and a preponderance of air under pressure for dislodging and flushing off the road and grease accumulations; fifth, flushing the remainder of the outside of the car with water of sufficient volume to float off the foreign matter therefrom; sixth, drying the body of the car and wheels by absorption after all foreign matter has been removed therefrom, whereby all scratching and marring of the finish is obviated.

2. The method of cleaning automobiles and the like as a continuous operation which consists of steps taken in the following order first spraying over the greasy parts a film of kerosene, second, dusting the interior of the car with compressed air during which time the grease absorbs the kerosene and becomes softened; third, washing the top of the car and simultaneously therewith subjecting the underside of the car and fenders and the wheels to an upwardly directed spray of water under pressure for softening the road accumulations thereon; fourth, subjecting the parts of the car thus treated to the action of a high velocity spray of water intermingled with a preponderance of air under pressure for removing the road and grease accumulations which have become softened under the action of the previous sprays; fifth, flushing the remainder of the outside of the car with water for floating off lightly lodged foreign matter therefrom, and lastly drying the automobile.

In testimony whereof, I have signed my name to this specification.

LOUIS J. BADARACCO.